3,234,204
WATER-SOLUBLE REACTIVE DISAZO DYES
Jakob Benz, Oberwil, Basel-Land, and August Schweizer, Muttenz, Basel-Land, Switzerland, assignors to Sandoz Ltd. (also known as Sandoz A.G.), Basel, Switzerland
No Drawing. Filed Jan. 15, 1962, Ser. No. 166,366
Claims priority, application Switzerland, Jan. 17, 1961, 523/61
The portion of the term of the patent subsequent to May 26, 1981, has been disclaimed
6 Claims. (Cl. 260—146)

This invention relates to water-soluble reactive disazo dyes of the formula

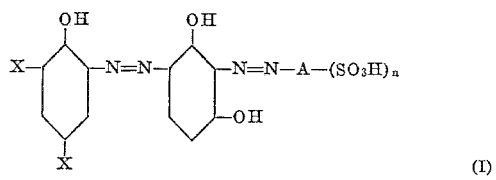

(I)

and their copper and nickel complex compounds. wherein one X represents a sulfonic acid group, the other X an —NH—R group where R stands for a halogenopyrimidyl radical permitting formation of the chemical linkage with the substrate, and A a radical of the benzene or naphthalene series which may contain further substituents, and $n$ one of the integers 2 or 3.

The process for the production of these dyes comprises coupling 1 mol of the diazo compound of an amine of the formula $$H_2N—A—(SO_3H)_n \qquad (II)$$

where A and $n$ have the afore-cited meanings, with 1 mol of a metallized or unmetallized monoazo dye of the formula

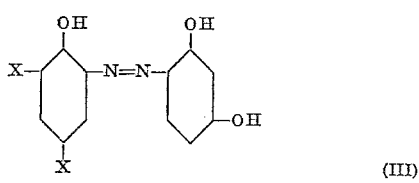

(III)

wherein the two X's have the aforenamed meanings, and converting the resulting disazo dye, if unmetallized, into the copper or nickel complex compound.

A modification of the process comprises coupling 1 mol of the diazo compound of an amine of the Formula II with 1 mol of the metallized or unmetallized monoazo dye of the formula

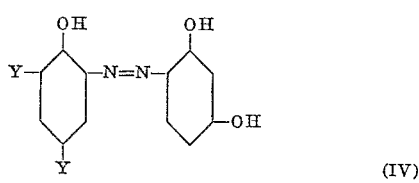

(IV)

wherein one Y represents a sulfonic acid group and the other Y a nitro or hydrolysable acylamino group, converting in the resulting disazo dye the nitro group, if present, by reduction or the saponifiable acylamino group, if present, by hydrolysis into the free amino group and reacting the resulting aminodisazo dye with a reactive component of the formula $$R—Hal \qquad (V)$$

wherein R has the above-named meaning and Hal represents chlorine or bromine, and converting the product, if necessary, into the copper or nickel complex compound before or after the reaction with R—Hal.

The substituents, which may be contained in the radical A apart from the sulfonic acid groups are e.g. halogen atoms (chlorine and bromine), low molecular alkyl or alkoxy groups (methyl, methoxy, ethoxy). The following amines of Formula II are preferably used:

1-aminobenzene-2,4-disulfonic acid
1-aminobenzene-2,5-disulfonic acid
1-aminobenzene-3,5-disulfonic acid
1-amino-2-chlorobenzene-3,5-disulfonic acid
1-amino-2-methylbenzene-3,5-disulfonic acid
1-amino-2-methoxybenzene-3,5-disulfonic acid
2-aminonaphthalene-1,5-disulfonic acid
2-aminonaphthalene-4,8-disulfonic acid
2-aminonaphthalene-5,7-disulfonic acid
2-aminonaphthalene-6,8-disulfonic acid
1-aminonaphthalene-3,7-disulfonic acid
1-aminonaphthalene-4,6-disulfonic acid
1-aminonaphthalene-4,7-disulfonic acid
2-aminonaphthalene-1,5,7-trisulfonic acid
2-aminonaphthalene-3,5,7-trisulfonic acid
2-aminonaphthalene-4,6,8-trisulfonic acid
1-aminonaphthalene-3,6,8-trisulfonic acid
1-aminonaphthalene-4,6,8-trisulfonic acid The coupling of the diazo compounds of the amines of Formula II with the coupling components of the Formulae III or IV is carried out in weakly acid, neutral to alkaline medium at low temperatures, preferably between 0° and 20° C.

The monoazo dyes of Formulae III and IV are produced by coupling the diazo compounds of amines of the formulae

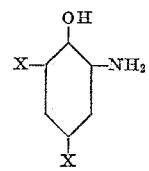

or

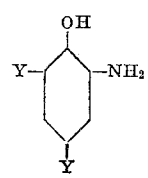

wherein X and Y possess the aforestated meanings, with 1,3-dihydroxybenzene in an acid, neutral or preferably alkaline medium at low temperatures, e.g. 0–20° C.

When in Formula IV one Y represents a nitro group, this group is reduced after the formation of the disazo dye, e.g. by treatment with an aqueous solution of sodium sulfide or sodium hydrogen sulfide, preferably at temperatures of 40° to 70° C. If the disazo dye employed contains copper or nickel atoms in complex combination, these metals are separated as insoluble sulfides during reduction so that the aminodisazo dye must be metallized again before or after the introduction of the reactive group.

When in Formula IV one Y represents an acylamino group, this group is hydrolysed in the disazo dye at 70–100°, e.g. by heating in an aqueous solution of an alkali metal hydroxide, preferably in a 5–10% sodium or potassium hydroxide solution, at 70–100° C. or in a dilute mineral acid, preferably 5–10% hydrochloric or sulfuric acid, at 70–100° C. In the case of acid hydrolysis, demetallization takes place when the dye used is a metal-containing disazo dye, while in the case of alkaline hydrolysis no demetallizing occurs.

The radical R contains at least one substituent which can be split off as an anion and/or a multiple linkage capable of addition; it is preferably the radical remaining after cleavage of a chlorine or bromine atom of a polyhalogenated pyrimidine such as 2,4,6-trichloropyrimidine or 2,4,6-tribromopyrimidine, their derivatives which bear in the 5-position the following substituents: methyl, ethyl; alkenyl, e.g. allyl, chlorovinyl, bromovinyl; substituted alkyl, e.g. carboxymethyl, chloro- or bromo-methyl; 2,4,5,6-tetrachloro- or -tetra-bromopyrimidine, 2,6-dichloro- or -dibromo-pyrimidine-4-carboxylic acid methyl or ethyl ester, 2,4,5-trichloro- or 2,4,5-tribromopyrimidine, 2,6-dichloro- or -dibromo-pyrimidine, 2,4-dichloro - 5 - chloromethyl-6-methylpyrimidine, 2,4-dibromo-5-bromomethyl-6-methylpyrimidine, 2,4 - dichloro-5-chloromethyl-pyrimidine, 2,4-dibromo-5-bromomethylpyrimidine, 2,5,6 - trichloro- or 2,5,6-tribromo-4-methylpyrimidine, 2,6-dichloro-4-trichloromethyl- or -4-methylpyrimidine.

The introduction of the acid radicals is effected most easily by using the corresponding acid halides. It is advisable to work at low temperatures, e.g. 0–20° C., and in presence of acid-binding agents such as sodium carbonate, sodium hydroxide, calcium hydroxide or sodium acetate at a weakly acid, neutral or weakly alkaline reaction, for example in the pH region 4 to 9. For the di-, tri- and tetra-halogenopyrimidines temperatures of 40° to 100° C. are the most suitable.

In view of the volatility in steam of certain halogenopyrimidines it is advisable to work in a vessel with a reflux condenser.

The reaction is conducted so that only one halogen atom reacts with an exchangeable hydrogen atom of the amino group.

The reaction may be carried out in weakly alkaline, neutral to weakly acid medium but preferably within the pH region of 9 to 3. To neutralize the halogen halide formed, an acid-binding agent is added to the reaction solution at the start of the reaction or, alternatively, small portions of sodium or potassium carbonate or bicarbonate in solid pulverized form or as a concentrated aqueous solution are added in the course of the reaction. Aqueous solutions of sodium or potassium hydroxide are also suitable as neutralizing agents. The addition of small amounts of a wetting or emulsifying agent to the reaction mixture can accelerate the rate of reaction.

The conversion of the monoazo compounds or disazo dyes containing the reactive group into their copper or nickel complex compounds is carried out preferably in weakly acid aqueous solution. It is advantageous to allow an amount of a metal-yielding agent containing one atom of metal to act upon one molecule of monoazo compound or disazo dye. If the monoazo compounds or disazo dyes contain an acylamino group in place of the reactive group, the metallization can be carried out in alkaline medium in the presence of ammonia or amines.

Suitable copper compounds are e.g. cupric sulfate, cupric formate, cupric acetate and cupric chloride. Suitable nickel compounds are e.g. nickel formate, nickel acetate and nickel sulfate.

The metal complex compounds obtained are precipitated from their aqueous solution by the addition of salt, then filtered off, washed if necessary, and dried.

The metal-containing azo dyes obtained are homogeneous metal complex compounds in which essentially one atom of metal is combined with one molecule of the disazo compound.

They possess good solubility in water, good stability in printing pastes and padding liquors, good compatibility to salts and hard water, good reactivity with vegetable fibers, animal and synthetic polyamide fibers; they are insensitive to heavy metals such as copper, iron and chromium and reserve acetate, triacetate, polyester, polyacrylonitrile, polyvinyl chloride, polyvinyl acetate and polyalkylene fibers. Owing to their very slight substantivity the unfixed dye portion can easily be removed from the dyeings and prints on cellulosic fibers.

The new reactive dyes and their copper or nickel complex compounds are well suitable for the dyeing of leather and the dyeing, padding, and printing of wool, silk, synthetic polyamide fibers, and fibers of natural or regenerated cellulose on which they give full bloomy brown shades.

The addition of certain quaternisable amines such as trimethylamine, triethylenediamine, asymmetric dimethylhydrazine, preferably in stoichiometric amounts, accelerates the fixation of the dye on the fiber, so that the fixation temperature can be lowered and/or the fixation time shortened.

The dyeings and prints are aftertreated in an alkaline medium at a higher temperature if necessary and are then soaped. If produced with the metal free dyes, they are then coppered, on which they possess good fastness to light, washing, water, sea water, potting, milling, perspiration, rubbing, alkali, acids, vulcanizing, chlorine, bleaching (peroxides), gas fumes and dry cleaning (organic solvents). In addition they are stable to resin finishing and to acid and alkaline hydrolytic influences. In the following examples the parts and percentages are by weight and the temperatures in degrees centigrade.

EXAMPLE 1

28 parts of 1-aminobenzene-2,5-disulfonic acid are dissolved in 300 parts of water and diazotized by the addition of 30 parts of 30% hydrochloric acid and a concentrated aqueous solution of 7.7 parts of sodium nitrite at 10°. The solution of the diazo compound is run into an ice-cooled alkaline solution of 57 parts of the copper complex compound of 3-(2″,5″,6″-trichloropyrimidyl-4″)-amino-2,2′4′-trihydroxyl-1,1′-azobenzene-5-sulfonic acid in 900 parts of water and 40 parts of sodium carbonate. On completion of coupling the solution is neutralized and heated to 80°, and the disazo dye formed is precipitated by the addition of sodium chloride, filtered off and dried. It is a black-brown powder which dissolves in water with a dark brown coloration.

A fabric of unmercerized cotton is printed with a paste of the following composition:

30 parts of the dye obtained as described above,
100 parts of urea
395 parts of water
450 parts of a 3% sodium alginate thickening
10 parts of sodium 1-nitrobenzene-3-sulfonate
15 parts of anhydrous sodium carbonate 1000 parts The print is dried, steamed for 10 minutes at 102–104°, rinsed in cold and warm water, soaped at the boil, rinsed again and dried. A bright brown print of good light and wet fastness is obtained.

A dye with similar properties is obtained when in place of the 57 parts of the above named copper complex compound of 3-(2″,5″,6″-trichloropyrimidyl-4″)-amino-2,2′,4′-trihydroxyl-1,1′-azobenzene-5-sulfonic acid, 56.4 parts of the nickel complex compound of 3-(2″,5″,6″-trichloropyrimidyl-4″)-amino-2,2′,4′-trihydroxy-1,1′ - azobenzene-5-sulfonic acid is used.

EXAMPLE 2

28 parts of 1-aminobenzene-2,5-disulfonic acid are added to 300 parts of water and diazotized at 10° by the addition of 15 parts of 30% hydrochloric acid and a concentrated aqueous solution of 7.7 parts of sodium nitrite. The resulting diazo compound is run into an ice-cooled solution of 37 parts of the monoazo dye 3-acetylamino-2,2′,4′-trihydroxy-1,1′-azobenzene-5-sulfonic acid in 500 parts of water and 30 parts of sodium carbonate. On completion of coupling the resulting disazo dye is precipitated at 50° by the addition of sodium chloride, filtered off and washed with sodium chloride solution.

The dye paste is dissolved in 600 parts of 5% hydrochloric acid and the solution heated to 80°. In the course of 3–4 hours, cleavage of the acetyl group takes place. The amino-disazo dye is precipitated by the addition of sodium chloride, filtered off and washed with dilute sodium chloride solution.

The dye paste is dissolved in 400 parts of water at 70° and the solution adjusted to a pH value of 5 with dilute sodium carbonate solution. An aqueous solution of 20 parts of crystallized copper sulfate is run in, the pH value being maintained between 4 and 6 by simultaneous addition of sodium carbonate solution. On completion of metallization the dye is precipitated by the addition of sodium chloride, filtered off and washed with dilute sodium chloride solution. It is then dissolved in 500 parts of water at 70° and the solution run into a stirring vessel fitted with a reflux condenser. 20 parts of 2,4,5,6-tetrachloropyrimidine are added and the reaction mixture stirred at 70–80° with the addition of sodium carbonate solution to give a constant pH value of 5–6. On completion of the reaction the dye solution is cooled to 40° and after the addition of 10 parts of active charcoal and stirring for a short time it is filtered clear. The reactive disazo dye formed is salted out of the filtrate by the addition of sodium chloride, filtered off and washed with dilute sodium chloride solution. On drying it is obtained as a black-brown powder which dissolves in water to give dark brown solutions.

When the 37 parts of the monoazo dye 3-acetylamino-2,2′,4′-trihydroxy-1,1′-azobenzene-5-sulfonic acid in the above example are replaced by 36 parts of the monoazo dye 3-nitro-2,2′,4′-trihydroxy-1,1′-azobenzene-5-sulfonic acid and the resulting nitrodisazo dye reduced in alkaline solution by the addition of sodium sulfide solution at a slightly increased temperature, an aminodisazo dye of the same constitution is obtained which, on metallizing according to the procedure of this example and reaction with 2,4,5,6-tetrachloropyrimidine, leads to the same reactive disazo dye.

EXAMPLE 3

When in place of the 20 parts of 2,4,5,6-tetrachloropyrimidine used in Example 2, 17 parts of 2,4,6-trichloropyrimidine are used and the procedure of that example is followed in all other respects, a black-brown powder is obtained which dissolves in water to give dark brown solutions.

The dyeing method for this dye is as follows:

3 parts of the dye of this example are dissolved in 100 parts of warm water with the subsequent addition of 10 parts of urea, 30 parts of a 10% sodium carbonate solution and 0.5 part of sodium 1-nitrobenzene-3-sulfonate. With this solution a fabric of spun viscose rayon is padded so as to give an increase of 75% over the dry weight. After drying, the fabric is steamed with wet steam for 5–10 minutes at 102°, then rinsed and soaped at the boil for 15 minutes. On drying a brown dyeing of very good light and wet fastness is obtained.

Further dyes coming within the scope of the present invention are listed in the following table. They are obtainable according to the particulars of Examples 1 to 3 and are characterized by the nature of the amines of Formula II, the coupling components, the reactive components, the metal used for complex formation, and the shade of the fixed dyeing on cotton.

Table

| Example No. | Amine of the formula (II) (I) | Monoazo dye used as coupling component (II) | R = Radical of— (III) | Metal (IV) | Shade of the fixed dyeing on cotton (V) |
|---|---|---|---|---|---|
| 4 | 2-aminonaphthalene-4,6,8-trisulfonic acid. | 3-R-amino-2,2′,4′-trihydroxy-1,1′-azobenzene-5-sulfonic acid. | 2,4,5,6-tetrachloropyrimidine. | Cu | Brown. |
| 5 | 1-aminobenzene-2,4-disulfonic acid. | ___do___ | ___do___ | Cu | Do. |
| 6 | 1-amino-2-methylbenzene-3,5-disulfonic acid. | ___do___ | ___do___ | Cu | Do. |
| 7 | ___do___ | ___do___ | ___do___ | Ni | Do. |
| 8 | 1-aminobenzene-2,5-disulfonic acid. | 5-R-amino-2,2′,4′-trihydroxy-1,1′-azobenzene-3-sulfonic acid. | ___do___ | Cu | Do. |
| 9 | 2-aminonaphthalene-3,5,7-trisulfonic acid. | ___do___ | ___do___ | Cu | Do. |
| 10 | 1-amino-2-methylbenzene-3,5-disulfonic acid. | ___do___ | ___do___ | Cu | Do. |
| 11 | 1-aminobenzene-3,5-disulfonic acid. | 3-R-amino-2,2′,4′-trihydroxy-1,1′-azobenzene-5-sulfonic acid. | 2,4,6-trichloropyrimidine. | Cu | Do. |
| 12 | 1-amino-2-methoxybenzene-3,5-disulfonic acid. | ___do___ | ___do___ | Cu | Do. |
| 13 | 2-aminonaphthalene-4,8-disulfonic acid. | ___do___ | ___do___ | Cu | Do. |
| 14 | 2-aminonaphthalene-5,7-disulfonic acid. | ___do___ | ___do___ | Ni | Do. |
| 15 | ___do___ | ___do___ | 2,4,6-tribromopyrimidine. | Cu | Do. |
| 16 | 2-aminonaphthalene-6,8-disulfonic acid. | ___do___ | 2,4,6-trichloropyrimidine. | Cu | Do. |
| 17 | 1-amino-2-chlorobenzene-3,5-disulfonic acid. | ___do___ | ___do___ | Cu | Do. |
| 18 | 2-aminonaphthalene-1,5-disulfonic acid. | ___do___ | 2,4,5,6-tetrachloropyrimidine. | Cu | Do. |
| 19 | 1-aminonaphthalene-3,7-disulfonic acid. | ___do___ | ___do___ | Cu | Do. |
| 20 | 1-aminonaphthalene-4,6-disulfonic acid. | ___do___ | ___do___ | Cu | Do. |
| 21 | 1-aminonaphthalene-4,7-disulfonic acid. | ___do___ | ___do___ | Cu | Do. |
| 22 | 1-aminonaphthalene-3,6,8-trisulfonic acid. | ___do___ | 2,4,5,6-tetrabromopyrimidine. | Cu | Do. |
| 23 | 2-aminonaphthalene-4,6,8-trisulfonic acid. | ___do___ | 2,4,5-tribromopyrimidine. | Cu | Do. |
| 24 | ___do___ | ___do___ | 2,4-dibromo-5-bromomethyl-6-methylpyrimidine. | Cu | Do. |
| 25 | 1-aminobenzene-2,5-disulfonic acid. | ___do___ | 2,4-dichloro-5-chloromethyl-6-methylpyrimidine. | Cu | Do. |
| 26 | 2-aminonaphthalene-3,6,8-trisulfonic acid. | ___do___ | 2,4,5-trichloropyrimidine. | Cu | Do. |
| 27 | 2-aminonaphthalene-3,5,7-trisulfonic acid. | 5-R-amino-2,2′,4′-trihydroxy-1,1′-azobenzene-3-sulfonic acid. | 2,4,6-trichloropyrimidine. | Cu | Do. |
| 28 | 1-aminobenzene-2,5-disulfonic acid. | ___do___ | 2,5,6-trichloro-4-methylpyrimidine. | Cu | Do. |
| 29 | ___do___ | ___do___ | 5-carboxymethyl-2,4,6-trichloropyrimidine. | Cu | Do. |

Table—Continued

| Example No. | Amine of the formula (II) (I) | Monoazo dye used as coupling component (II) | R = Radical of— (III) | Metal (IV) | Shade of the fixed dyeing on cotton (V) |
|---|---|---|---|---|---|
| 30 | 1-aminobenzene-3,5-disulfonic acid | 3-R-amino-2,2',4'-trihydroxy-1,1'-azobenzene-5-sulfonic acid. | 2,4,5,6-tetrachloropyrimidine | Cu | Brown. |
| 31 | 1-aminonaphthalene-3,6,8-trisulfonic acid. | ...do... | 2,4,6-trichloro-5-methylpyrimidine. | Cu | Do. |
| 32 | ...do... | ...do... | 2,4,6-tribromo-5-carboxymethylpyrimidine. | Cu | Do. |
| 33 | 2-aminonaphthalene-1,5,7-trisulfonic acid. | ...do... | 2,4-dibromo-5-bromomethyl-6-methylpyrimidine. | Cu | Do. |
| 34 | 1-aminonaphthalene-4,6,8-trisulfonic acid. | ...do... | 2,4,6-tribromo-5-methylpyrimidine. | Cu | Do. |
| 35 | ...do... | ...do... | 2,4,6-trichloro-5-chlorovinylpyrimidine. | Cu | Do. |
| 36 | 1-aminobenzene-2,5-disulfonic acid | ...do... | 2,4,6-trichloro-5-ethylpyrimidine | Cu | Do. |
| 37 | ...do... | ...do... | 2,4,6-trichloro-5-chloromethylpyrimidine. | Cu | Do. |
| 38 | 1-aminobenzene-2,4-disulfonic acid. | 5-R-amino-2,2',4'-trihydroxy-1,1'-azobenzene-5-sulfonic acid. | 2,6-dichloro-4-carbomethoxypyrimidine. | Cu | Do. |
| 39 | 1-amino-2-methoxybenzene-3,5-disulfonic acid. | 3-R-amino-2,2',4'-trihydroxy-1,1'-azobenzene-5-sulfonic acid. | 2,6-dibromopyrimidine | Cu | Do. |
| 40 | 1-aminobenzene-2,5-disulfonic acid | ...do... | 2,6-dichloropyrimidine | Cu | Do. |
| 41 | ...do... | ...do... | 2,6-dichloro-4-trichloromethylpyrimidine. | Cu | Do. |
| 42 | ...do... | ...do... | 2,5,6-tribromo-4-methylpyrimidine. | Cu | Do. |
| 43 | 2-aminonaphthalene-3,5,7-trisulfonic acid. | ...do... | 2,4,6-tribromo-5-bromovinylpyrimidine. | Cu | Do. |
| 44 | ...do... | ...do... | 2,4,6-tribromo-5-bromomethylpyrimidine. | Cu | Do. |
| 45 | 2-aminonaphthalene-6,8-disulfonic acid. | ...do... | 2,6-dichloro-4-carboethoxypyrimidine. | Cu | Do. |
| 46 | 2-aminonaphthalene-4,6,8-trisulfonic acid. | 5-R-amino-2,2',4'-trihydroxy-1,1'-azobenzene-3-sulfonic acid. | 2,6-dibromo-4-carboethoxypyrimidine. | Cu | Do. |
| 47 | ...do... | 3-R-amino-2,2',4'-trihydroxy-1,1'-azobenzene-5-sulfonic acid. | 2,6-dichloro-4-methylpyrimidine. | Cu | Do. |
| 48 | ...do... | ...do... | 2,4-dichloro-5-chloromethylpyrimidine. | Cu | Do. |

Formulae of representative dyes of the foregoing examples are as follows:

EXAMPLES 1 AND 2

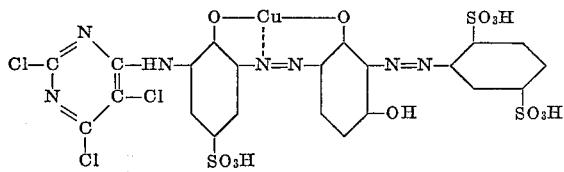

EXAMPLE 3

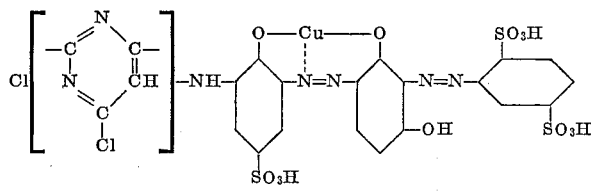

mixture of 2,6-dichloropyrimidyl-4-amino dye and of the 4,6-dichloropyrimidyl-2-amino dye.

EXAMPLE 4

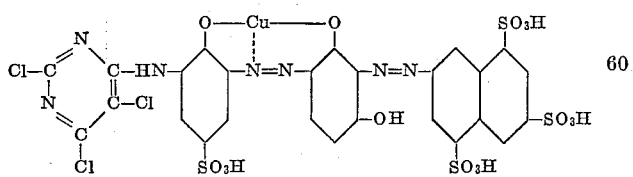

EXAMPLE 5

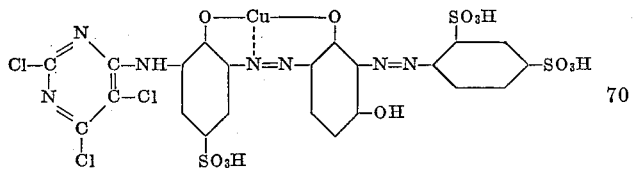

On condensing 2,4,5-trichloro- or 2,4,5-tribromopyrimidine with an amino dye, a mixture of the 2,5-dichloro- or 2,5-dibromo-pyrimidyl-4-amino dye and of the 4,5-dichloro- or 4,5-dibromopyrimidyl-2-amino dye is very probably obtained.

Similarly on condensing 2,6-dichloro- or 2,6-dibromopyrimidine or their derivatives with an amino dye, a mixture of the 2-chloro- or 2-bromopyrimidyl-6-amino dye and of the 6-chloro- or 6-bromopyrimidyl-2-amino dye is very probably obtained.

The derivatives of 2,4,6-trichloro- or 2,4,6-tribromopyrimidine bearing in the 5-position a substituent other than halogen gives mixtures similar to those produced with 2,4,6-trichloro- or 2,4,6-tribromopyrimidine (cf. formula of Example 3), whereas 2,4,6-trichloro-5-chloromethyl-pyrimidine and 2,4,6-tribromo-5-bromomethyl-pyrimidine react in the same manner as 2,4-dichloro-5-chloromethyl-pyrimidine and 2,4-dichloro-5-chloromethyl-6-methylpyrimidine.

Having thus disclosed the invention what we claim is:
1. A member selected from the group consisting of the copper and nickel complex compounds of a water-soluble reactive disazo dye of the formula

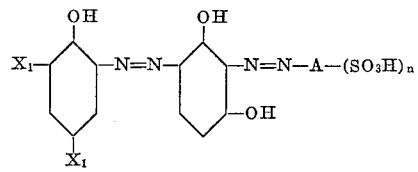

wherein
A represents a member selected from the group consisting of a radical of the benzene series and a radical of the naphthalene series,
$n$ is one of the integers 2 and 3,
one $X_1$ represents a sulfonic acid group,
and the second $X_1$ represents a halopyrimidylamino radical selected from the group consisting of
2,6-dihalogenopyrimidyl-4-amino,
4,6-dihalogenopyrimidyl-2-amino,
2,5,6-trihalogeno-pyrimidyl-4-amino,
2,6-dihalogeno-5-lower alkyl-pyrimidyl-4-amino,
4,6-dihalogeno-5-lower alkyl-pyrimidyl-2-amino, 2,6-dihalogeno-5-carboxymethyl-pyrimidyl-4-amino,
4,6-dihalogeno-5-carboxymethyl-pyrimidyl-2-amino,
2,6-dihalogeno-5-halogenovinyl-pyrimidyl-4-amino,
4,6-dihalogeno-5-halogenovinyl-pyrimidyl-2-amino,
2,5-dihalogenopyrimidyl-4-amino,
4,5-dihalogenopyrimidyl-2-amino,
2,5-dihalogeno-4-methylpyrimidyl-6-amino,
5,6-dihalogeno-4-methylpyrimidyl-2-amino,
2-halogenopyrimidyl-6-amino,
6-halogenopyrimidyl-2-amino,
2-halogeno-4-lower carbalkoxy-pyrimidyl-6-amino,
6-halogeno-4-lower carbalkoxypyrimidyl-2-amino,
2-halogeno-4-methyl-pyrimidyl-6-amino,
6-halogeno-4-methylpyrimidyl-2-amino,
2-halogeno-4-trihalogenomethylpyrimidyl-6-amino,
6-halogeno-4-trihalogenomethylpyrimidyl-2-amino,
2,4-dihalogeno-6-methyl-pyrimidyl-5-methylene-amino,
2,4-dihalogenopyrimidyl-5-methylene-amino and
2,4,6-trihalogeno-pyrimidyl-5-methylene-amino;
halogen having an atomic weight between 35 and 81.

2. The dye of the formula

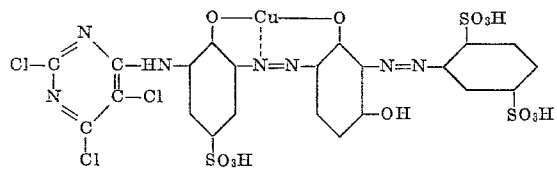

3. The dye of the formula

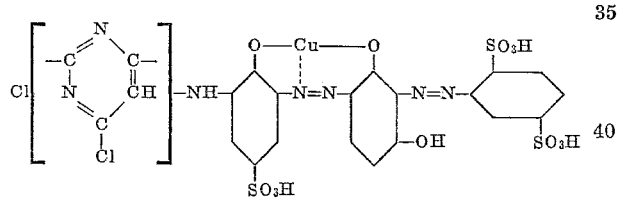

4. The dye of the formula

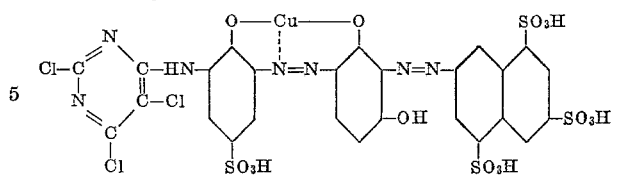

5. The dye of the formula

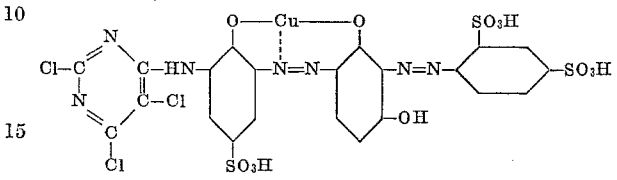

6. The dye of the formula

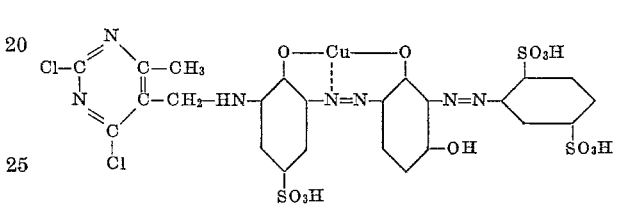

References Cited by the Examiner

UNITED STATES PATENTS

| | | | |
|---|---|---|---|
| 2,200,445 | 5/1940 | Fellmer | 260—148 |
| 2,763,640 | 9/1956 | Riat et al. | 260—146 |
| 3,134,760 | 5/1964 | Schweizer et al. | 260—146 |

FOREIGN PATENTS

| | | |
|---|---|---|
| 214,546 | 4/1961 | Austria. |
| 1,221,621 | 1/1960 | France. |
| 1,225,281 | 2/1960 | France. |

OTHER REFERENCES

Wegmann: "Textil-Praxis," October 1958, pages 1056–1061.

CHARLES B. PARKER, *Primary Examiner.*